Patented June 7, 1932

1,861,643

UNITED STATES PATENT OFFICE

MARCELLO PIRANI, OF BERLIN-WILMERSDORF, GERMANY, ASSIGNOR TO GENERAL ELECTRIC COMPANY, A CORPORATION OF NEW YORK

ELECTRIC DISCHARGE DEVICE

No Drawing. Application filed June 22, 1929, Serial No. 373,065, and in Germany July 16, 1928.

The present invention relates to improvements in the method of securing constancy in the light of vacuum tubes containing a filling of common gas, and more particularly the invention relates to improvements in removing deleterious gaseous impurities from the gaseous atmosphere.

The change of color and extinguishment of the light of a vacuum tube due to change of pressure therein during discharge is essentially due to three causes: (1) The electrodes and the wall of the tube may give off gaseous impurities which cause an increase in the pressure of the gas, and cause the light giving material e. g., nitrogen or hydrogen, to behave in an undesired manner, its characteristic light being altered by the presence of small quantities of foreign gases; (2) An absorption of the light giving gas accompanied by a diminution of pressure may take place owing to the vaporization or pulverization of the electrodes whereby an undesired change in the color of the light takes place; and (3) Gaseous impurities may have been left behind by incomplete exhaustion of the tube before it was filled with the desired light giving gas, a small percentage of these impurities changing the color of the discharge. In order to produce and maintain the characteristic color in these cases purification of the gas is necessary in the first and third cases and its regeneration in the second case.

The present invention has for its object to provide a method and a process for affecting vacuum light tubes in such a manner that the above mentioned different causes of the extinguishment and of the changes in the color of the light can be readily removed.

According to my invention, the tube of the electric light is first evacuated and then filled with a common gas such as nitrogen or hydrogen. This gas is kept at constant pressure in the tube by the use of a suitable gas evolving material which evolves gas of like nature as that in the tube. Such material may be sodium nitride or barium nitride. For example, when sodium azide is used, as soon as the pressure in the tube drops the electric current increases and the temperature rises to such a degree that nitrogen is caused to evolve which restores the pressure. The rise in temperature also causes the sodium and other deleterious gaseous impurities to vaporize. These impurities get into the path of the arc, creating a resistance to the passage of the current, which causes an abnormal heating of the whole apparatus. By mixing with the desired evolved gas, in this case nitrogen, the impurities also affect the color of the light. It has been found that when an absorbent such as tin, bismuth, lead or gold is mixed with the gas evolving material, such absorbent or "getter" reacts with the waste products of the decomposition other than the evolved nitrogen to immediately form a mixture or compound or alloy of a lower vapor pressure than that of the nitrogen, so that no vapor from the said waste products can pass over into the discharge path of the tube. Thus these deleterious impurities are kept out of the atmosphere of the tube, while the evolving or evolved nitrogen is not affected. These same absorbents may be used with the hydrides of such metals as lithium, potassium, calcium, sodium or barium when hydrogen is desired as the tube filling. They react in the same manner with the waste products of the decomposition as heretofore described, while not affecting the evolution of hydrogen or reacting with it in its gaseous state.

Various means or methods may be used for carrying out the invention. After the absorbent has been mixed with the gas evolving material this mixture may be put in the hollow of the electrode or deposited in a little cup in the tube itself. By mixing a non-decomposing binding material with the absorbent and the gas evolving material a bar may be formed to be placed in any convenient portion of the tube. As heat is necessary for the evolution of the desired gas filling from the gas evolving material, it is advisable that this material be placed in close proximity to the electrodes or the arc. Another expedient is the heating of the gas evolving material by some suitable means as a series heated filament, ring or mantle in operative relation to said material and brought into action by the rise in tube current resulting from a fall in gas pressure in the tube.

Although I have shown and described and have pointed out in the annexed claims certain novel features of the invention, it will be understood that various omissions, substitutions and changes may be made by those skilled in the art without departing from the spirit of the invention.

What I claim as new and desire to secure by Letters Patent of the United States is:

1. The method of maintaining constant pressure in a gaseous electric discharge device which consists in utilizing increase in temperature in the discharge gas path to cause the liberation of the desired gas from a gas evolving compound and availing of the reaction between the by-products of the decomposition of the gas supplying compound and materials reactive therewith and inert with respect to the discharge gas to keep said impurities from the discharge path.

2. The method of maintaining constant pressure in a gaseous electric discharge device which consists in utilizing increases in temperature in the discharge gas path to cause the liberation of the desired gas from a gas evolving compound and simultaneously causing a reaction between the by-products of the decomposition of the gas supplying material and materials reactive therewith and inert with respect to the discharge gas to keep said impurities from the discharge path.

3. An electric discharge device comprising a sealed container, electrodes sealed therein, a gas evolving material and a material inert with respect to the discharge supporting gas and reacting with the by-products of decomposition of the gas supplying material in the tube to keep them from the discharge path.

4. An electric discharge device comprising a sealed container, electrodes sealed therein, a decomposable gas supplying substance therein, and a material inert with respect to the discharge supporting gas and reacting with the by-products of decomposition of the gas supplying material in the tube to form substances of low vapor pressure in the tube.

5. An electric discharge device comprising a sealed container, electrodes therein, a gas evolving material therein, and a material inert with respect to the discharge supporting gas and reacting with the by-products of decomposition of the gas evolving material in the tube to form inactive substances in the tube.

In witness whereof, I have hereunto set my hand, this 5th day of June, 1929.

MARCELLO PIRANI.